F. D. HOLDSWORTH.
TRUCK.
APPLICATION FILED SEPT. 28, 1918.

1,363,205.　　　　　　　　　　　　Patented Dec. 21, 1920.

Inventor:
Fred D. Holdsworth
by
Arthur L. Calvert
atty.

UNITED STATES PATENT OFFICE.

FRED D. HOLDSWORTH, OF CLAREMONT, NEW HAMPSHIRE, ASSIGNOR TO SULLIVAN MACHINERY COMPANY, A CORPORATION OF MASSACHUSETTS.

TRUCK.

1,363,205.   Specification of Letters Patent.   Patented Dec. 21, 1920.

Application filed September 28, 1918. Serial No. 256,067.

*To all whom it may concern:*

Be it known that I, FRED D. HOLDSWORTH, a citizen of the United States, residing at Claremont, in the county of Sullivan and State of New Hampshire, have invented certain new and useful Improvements in Trucks, of which the following is a full, clear, and exact specification.

This invention relates to trucks, and especially to heavy trucks of the type commonly used in mines and quarries for transporting large air compressors which supply air under pressure for operating pneumatic tools, the object of the present invention being to support the mining truck on a running gear that can be adjusted to the different gage tracks used in mines and quarries and in similar work, in such a manner that but few extra parts need be kept in stock for effecting a change from one gage to another.

In the manufacture of trucks, it has been the practice, heretofore, to mount the wheels on long axles extending substantially across the truck frame, and to key or otherwise fasten the wheels on the ends of the axles so that the axles would turn with the wheels, in order to obtain a strong, substantial running gear. This construction necessitated the keeping in stock of several lengths of axles or axles of the maximum length that would be used and the cutting of these axles down to the lengths required for the different gages.

These defects I have overcome in the present invention, which will be best understood by reference to the following description when taken in connection with the accompanying illustration of one specific embodiment thereof, while its scope will be more particularly pointed out in the appended claims.

In the drawings,—

Figure 1:
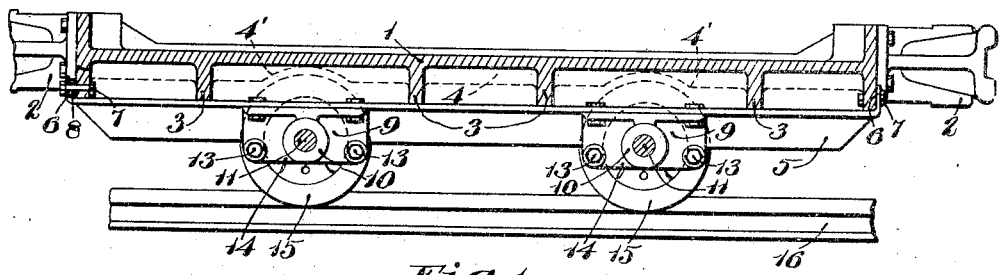
Figure 1 is a sectional view, taken on line 1—1 of Fig. 3, of a truck provided with my adjustable gage running gear.
Figure 2:
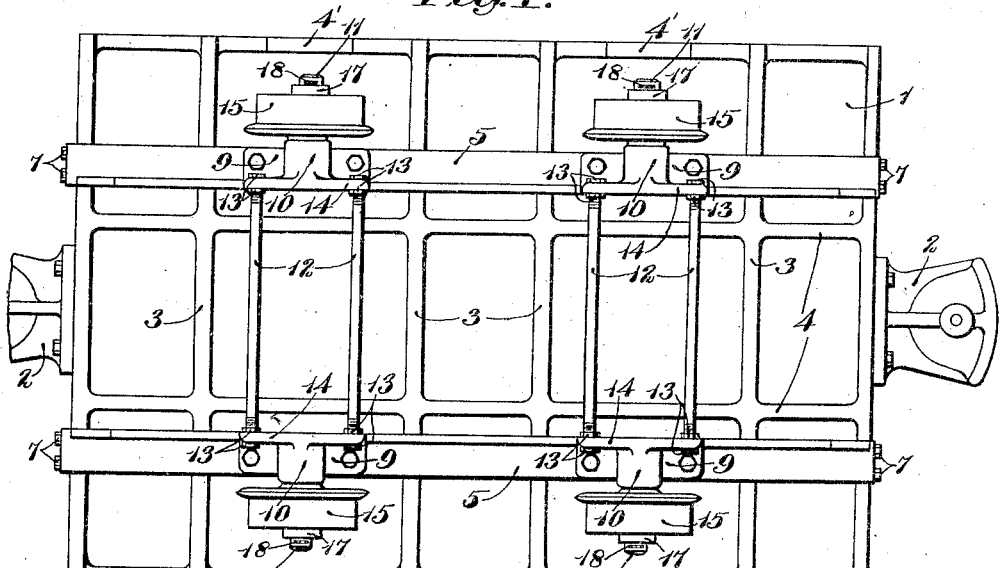
Fig. 2 is a bottom plan view thereof.
Figure 3:
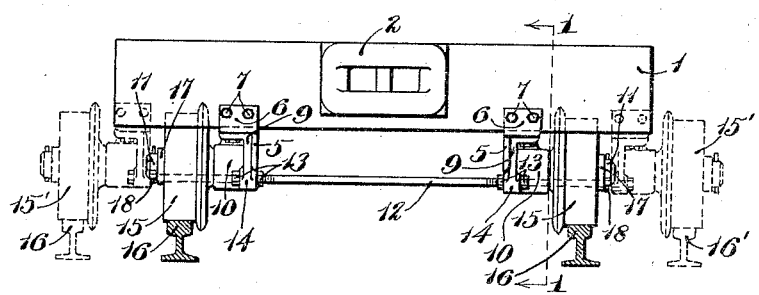
Fig. 3 is an end elevation of the truck.

Referring to the drawings and to the embodiment of my invention therein disclosed, I have there shown for illustrative purposes a truck bed 1, adapted to receive an air compressor or other heavy load, and having centrally disposed on the ends thereof coupling means 2 of a type usually mounted on trucks, the truck being also formed with integral cross webs 3 and longitudinal webs 4 cast on the under side of the bed to reinforce it.

The bed 1 is supported on two angle iron frame members 5, having upturned flanges 6 adapted to receive bolts 7 for securing the angle irons to the bed. The angle irons have a greater length than the truck bed to allow for inaccuracies in the casting of the latter, and shims 8 are inserted between one end of the bed and the flanges adjacent that end to provide against relative movement of the truck bed and the angle irons 5.

Heavy cast iron angle blocks 9 carrying bosses 10, in which are mounted stub axles 11, are bolted onto the frame members in spaced relation to the ends thereof, so that the stub axles 11 are rigidly secured in a horizontal plane parallel to the truck bed. Tie rods 12 connect the oppositely disposed blocks 9 and hold the latter against relative movement by means of nuts 13 threaded onto the tie rods into contact with the sides of the vertical webs 14 of the angle blocks 9. Wheels 15 resting on track rails 16, are rotatably mounted on the stub axles 11 and are secured thereto by washers 17 and cotter pins 18, as is clearly shown in the drawing.

When a workman desires to adjust a truck running gear to a certain gage track, he slides the angle irons 5 along the bottom of the truck bed until the wheels are equally spaced from the sides of the bed and are spaced apart the required distance. He then bores holes in the end webs of the bed and bolts the frame members thereto. Brace rods 12 are cut to the desired length, threaded, and secured in place. To provide for the transverse adjustment of the wheels, the longitudinal webs 4 are cut away as shown at 4' to give the proper clearance for the wheels. By placing the stub axle in a boss mounted on the outside of the blocks, I have made it possible to use this truck on a track whose gage is greater than the width of the truck bed as is shown at 15', 16'.

While I have herein shown and described for purposes of illustration one specific form of the invention, it is to be understood that the same has been chosen for illustrative purposes only, and that extensive deviations may be made from the disclosed form thereof without departing from the spirit of the invention.

What I claim as new and desire to secure by Letters Patent is:

1. In a truck, the combination comprising a truck bed, frame members adjustably mounted thereon, and guided by the front and rear ends thereof, stub axles carried by said frame members, and wheels mounted on said stub axles.

2. In an adjustable gage running gear, the combination comprising angle blocks, oppositely disposed separate axles thereon, wheels mounted on said axles, and means including a plurality of bracing members rigidly connected to said block for holding said axles in spaced relation.

3. In an adjustable gage truck, a truck bed, a plurality of running gear units adjustable laterally thereon and guided thereby, each unit comprising a frame member, axles attached thereto, wheels rotatably mounted on said axles and means for rigidly connecting said units.

4. In a truck, the combination comprising a truck bed, frame members thereunder having angularly disposed ends guided by said bed, stub axles mounted thereon, wheels rotatably mounted on said axles, bracing means rigidly connecting the frame members, and means for rigidly attaching the frame members in adjusted position to the truck bed.

5. In a truck, the combination comprising a truck bed, frame members laterally adjustable thereon, wheels rotatably mounted on said members, the relative position of the wheels being adjustable through a movement of said members relative to said truck bed, and means of varied length for rigidly connecting said members in their adjusted positions.

6. As an article of manufacture, a truck forming element comprising a frame member having stub axles mounted thereon, and a wheel mounted on each of said stub axles, said frame having angularly disposed ends for attachment at suitable points to a truck bed.

7. As an article of manufacture, a truck forming element comprising a frame element having stub axle mountings thereon, stub axles in said mountings, and a wheel mounted on each of said stub axles, said frame having angularly disposed ends for attachment at a plurality of desired positions to a truck bed and said axle mountings having sockets thereon for cross braces.

8. As an article of manufacture, a universal gage truck consisting of a truck bed and a pair of frame members having wheels suitably mounted thereon, said frame members having angularly disposed ends adapted to be secured at any desired distance apart to the ends of said truck bed.

9. In a truck, the combination comprising a truck bed, frame members, depending stub axle mountings on said frame members, stub axles in said mountings, wheels rotatably mounted on said axles, means for rigidly attaching the frame members in adjusted position on the truck bed, and brace members between said stub axle mountings.

10. In a truck, the combination comprising a truck bed, frame members, depending stub axle mountings on said frame members, stub axles outwardly projecting from said mountings, wheels rotatably mounted on said axles, means for rigidly attaching the frame members in adjusted position on the truck bed, and tension members between said stub axle mountings.

11. In a truck the combination comprising a truck bed, frame members, depending stub axle mountings on said frame members, stub axles outwardly projecting from said mountings, wheels rotatably mounted on said axles, means for rigidly attaching the frame members in adjusted position on the truck bed, and tension members between said stub axle mountings and below the axes of said axles.

12. In a mine truck, a bed adapted to receive the load for said truck, a plurality of longitudinally disposed frame members beneath the same engageable therewith and freely adjustable laterally into parallel relation with one another to conform to different track gages, wheels on said frame members, means for rigidly connecting said frames into a unit when in the desired position, and means for rigidly attaching said unit to said bed.

13. In a mine truck, a bed of at least as great length as width, a plurality of longitudinally disposed frame members beneath the same engageable therewith at a plurality of longitudinally spaced points and freely adjustable laterally into parallel relation with one another at any desired distance to conform to different track gages, a plurality of wheels on each of said frame members, means for rigidly connecting said frames into a unit when in any desired position, and means for rigidly attaching said unit to said bed.

14. In a mine truck, a bed of at least as great length as width, a plurality of longitudinally disposed frame members beneath the same engageable therewith at a plurality of longitudinally spaced points and freely adjustable laterally into parallel relation with one another at any desired distance to conform to different track gages, a plurality of wheels on each of said frame members, means for rigidly connecting said frames into a unit when in any desired position, and means for rigidly attaching said unit to said bed including up-turned ends on said frame members engageable with the ends of said truck bed.

15. In combination, a truck bed, frame members adapted for attachment thereto in parallel relation and running longitudinally thereof, and truck wheels on said frame members, said frame members being formed for attachment only to the ends of said truck.

In testimony whereof I affix my signature.

FRED D. HOLDSWORTH.

It is hereby certified that in Letters Patent No. 1,363,205, granted December 21, 1920, upon the application of Fred D. Holdsworth, of Claremont, New Hampshire, for an improvement in "Trucks," errors appear in the printed specification requiring correction as follows: Page 2, line 11, claim 1, strike out the comma; same page, line 20, claim 2, for the word "block" read *blocks;* line 86, claim 11, after the word truck insert a comma; and that the said Letters Patent should be read with these corrections therein that the same may conform to the record of the case in the Patent Office.

Signed and sealed this 1st day of February, A. D., 1921.

[SEAL.]

L. B. MANN,
*Acting Commissioner of Patents.*

Cl. 105—178.